United States Patent

Wang

Patent Number: 5,295,576
Date of Patent: Mar. 22, 1994

[54] ANTI-THEFT CD CARTRIDGE

[76] Inventor: Chuan-Chung Wang, 256, Yuantung Road, Chungho City, Taipei, Taiwan

[21] Appl. No.: 8,134

[22] Filed: Jan. 25, 1993

[51] Int. Cl.⁵ .................................. B65D 85/57
[52] U.S. Cl. ........................... 206/309; 206/1.5; 206/807
[58] Field of Search ............ 206/1.5, 307, 309, 387, 206/444, 807

[56] References Cited

U.S. PATENT DOCUMENTS

| | | | |
|---|---|---|---|
| 4,589,549 | 5/1986 | Hehn | 206/1.5 |
| 4,759,442 | 7/1988 | Gregerson et al. | 206/1.5 |
| 4,834,238 | 5/1989 | Hehn et al. | 206/1.5 |
| 4,865,190 | 9/1989 | Gregerson et al. | 206/1.5 |
| 4,886,166 | 12/1989 | Bankier et al. | 206/807 |
| 5,211,283 | 5/1993 | Weisburn et al. | 206/1.5 |

Primary Examiner—Jimmy G. Foster
Attorney, Agent, or Firm—Morton J. Rosenberg; David I. Klein

[57] ABSTRACT

The present invention relates to an anti-theft CD cartridge includes a long cartridge with a side space for CD and the other side of space for handling, and a buckling device on the center to buckle a stopper to keep the CD on the space safely. The stopper can be opened by a special opening device to take out the CD.

1 Claim, 3 Drawing Sheets

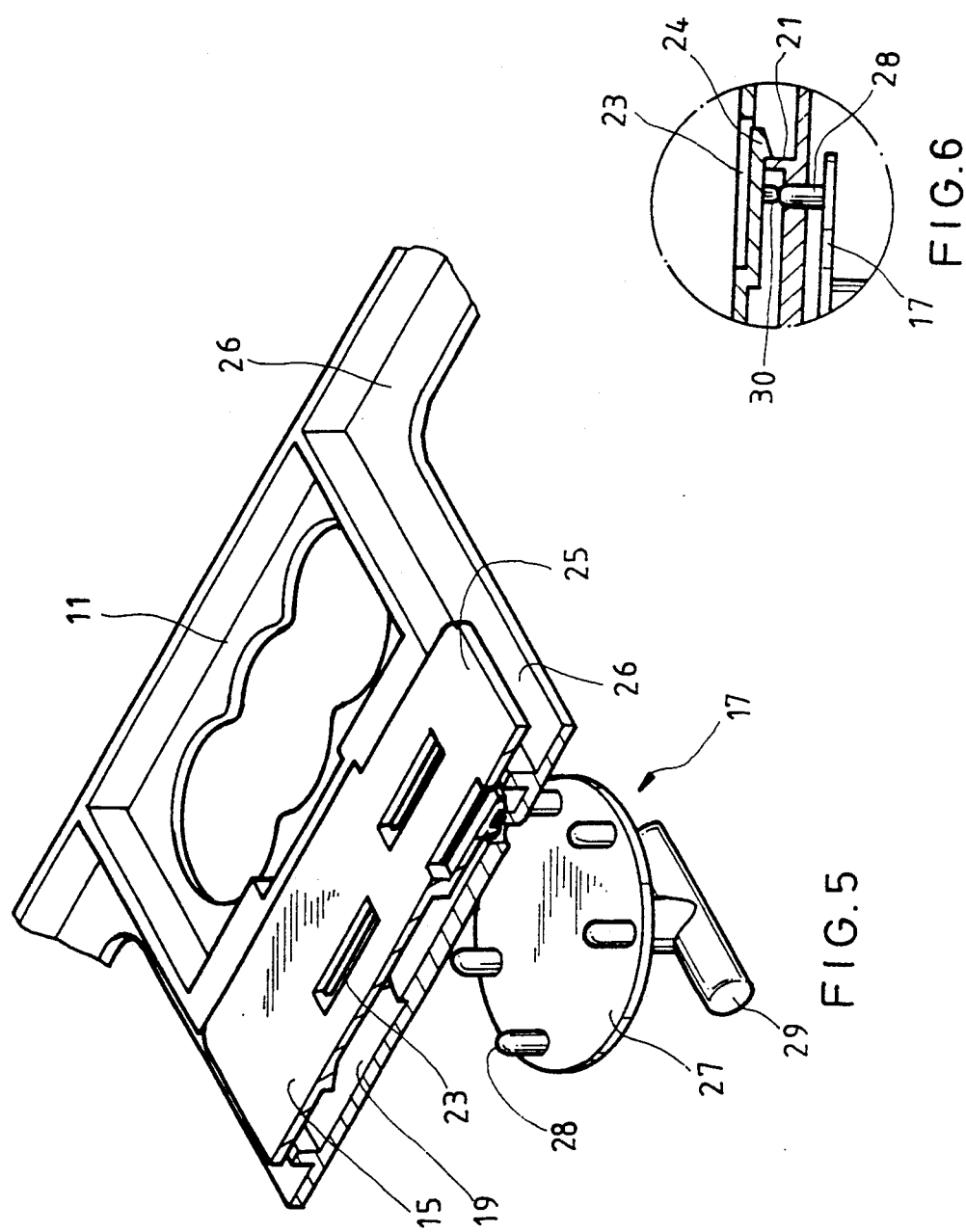

ANTI-THEFT CD CARTRIDGE

BACKGROUND OF THE INVENTION

This invention relates to an anti-theft compact disc (CD) cartridge. In particular, this invention pertains to an anti-theft CD cartridge having an opening device to control the removal of a CD to prevent unauthorized removal. CDs are growing in popularity and are replacing the conventional LP due to the CD's quality and durability. Most CDs are placed in small vending areas for the customers to review and make selections. This kind of compact size allows thieves to remove CDs without authorization. It is difficult to detect unauthorized removal of CDs from the cartridges. This problem has become of concern to vendors. However, it is necessary for customers to view CDs for comparison purposes and to read the external packages. If vendors lock CDs in a cabinet to prevent theft, such is not convenient for either the customers or the vendors. If the vendor uses open space for display, it has been found difficult to prevent theft. Additionally, the vendor must spend more time in surveillance and pay additional attention to the care of the CDs.

SUMMARY OF THE INVENTION

This invention offers a new concept for an anti-theft CD cartridge to obviate the aforementioned disadvantages. The concept includes a structure for CD cartridges to necessitate opening by a special opening device to remove the CD and prevent unauthorized removal.

The purpose of this invention is to provide an anti-theft cartridge that allows demonstration of the CD and prevents stealing of the CD. The anti-theft cartridge may be placed in the store for customers to make their selections while preventing CD unauthorized removal. This invention aids sellers in managing CD inventory.

The anti-theft cartridge is slightly larger than a CD and does not affect its storage and demonstration capabilities. At the same time, a thief cannot remove the cartridge without being detected. In this manner, the cartridge lessens the threat of theft.

BRIEF DESCRIPTION OF THE DRAWINGS

FIG. 5 is a perspective cross-section view showing the anti-theft device and an opening device; and, FIG. 6 is a cross-section view of the anti-theft device.

DESCRIPTION OF THE PREFERRED EMBODIMENT

Figure 1:
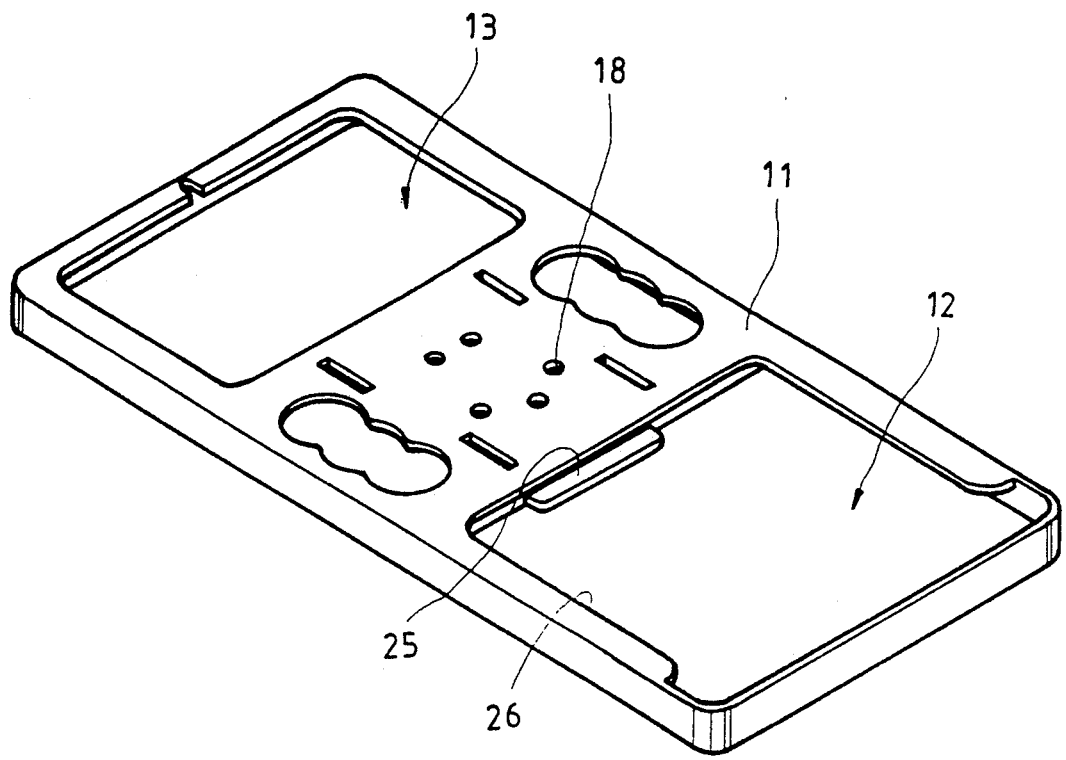
FIG. 1 is a perspective top view of an anti-theft CD cartridge.

The anti-theft compact disc (CD) cartridge includes an extended cartridge housing 11 having a containment space 12 for the CD 16. The cartridge housing 11 includes handle opening 13 formed through one side thereof and a buckling device 14 to buckle or fasten the stopper member 15 in releasable securement to the cartridge housing 11 and keep the CD 16 safely within the confines of containment space 12. A special opening member 17 is designed to open the stopper member 15 and remove the CD 16.

Figure 2:
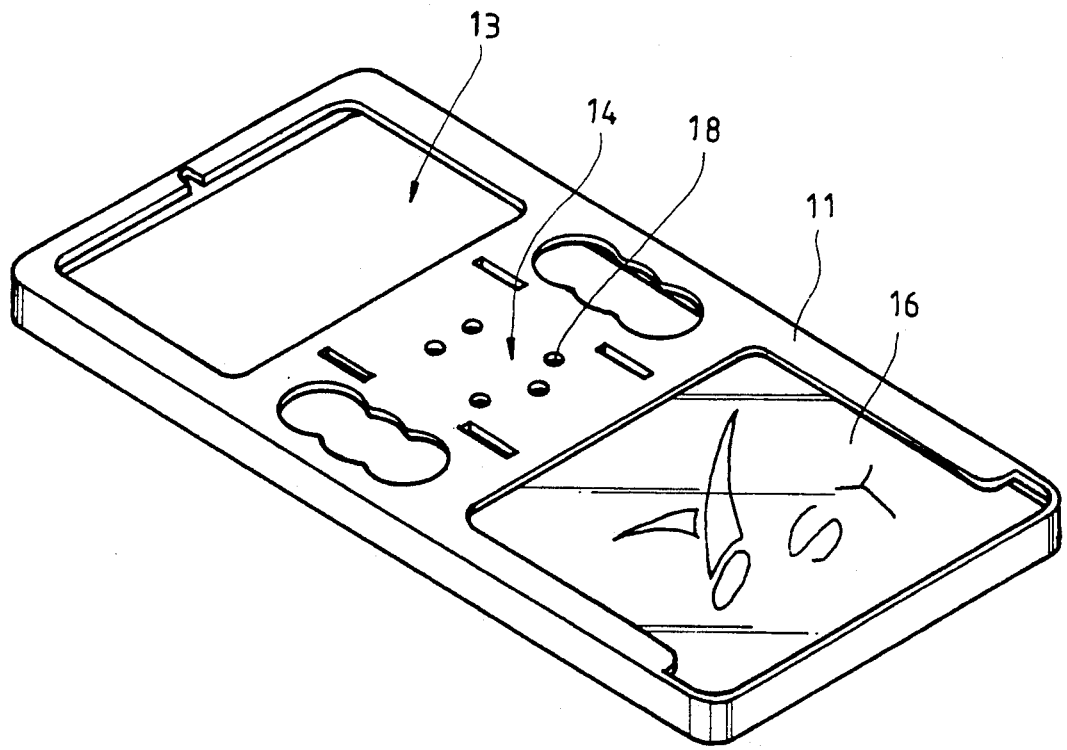
FIG. 2 is a perspective view of an anti-theft CD cartridge containing a CD.
Figure 3:
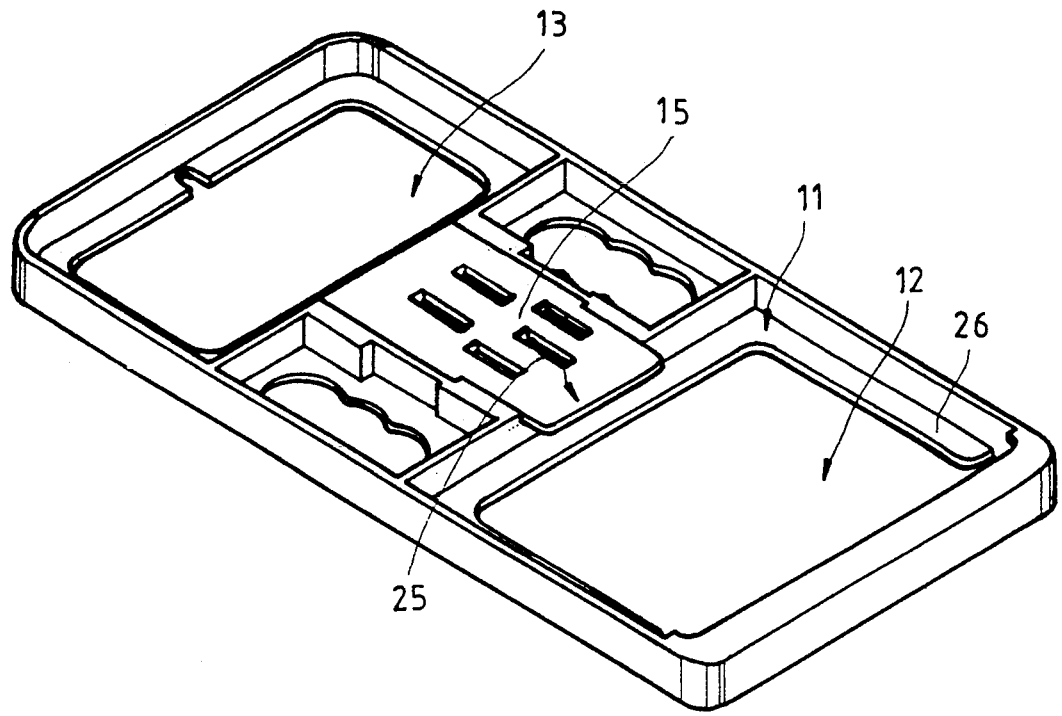
FIG. 3 is a perspective bottom view of FIG. 1 showing the internal space for a CD.
Figure 4:
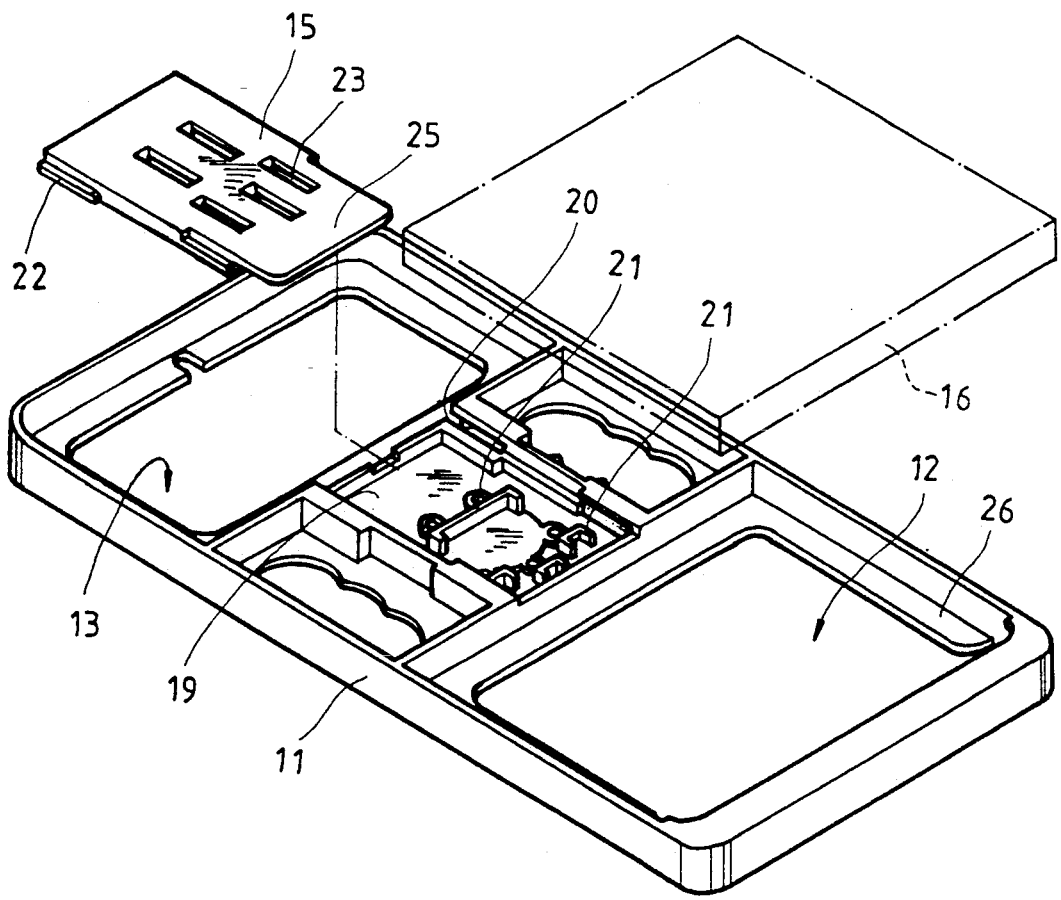
FIG. 4 is a perspective bottom view of FIG. 2 showing a stopper member removed to allow removal of a CD.

Referring to FIGS. 2, 4–6, the buckling device 14 includes a plurality of buckle holes 18 formed through a center section of cartridge housing 11. The center section includes a recess 19 to be covered by the stopper 15 and enclose the recess 19. A stopper flange 21 is formed on the bottom surface of recess 19 for insert and securement of stopper 15 for holding stopper 15 and cartridge housing 11 in gripping relation.

Stopper 15 includes flanges 22 formed on each side of stopper 15 for sliding insert into respective connecting slots 20. A plurality of buckle grooves 23 are formed through stopper 15 and are aligned with buckle holes 18 of stopper 15 and buckle 24 formed within each buckle groove 23 as shown in FIG. 6. The buckle 24 is connected to stopper flange 21 by frictional engagement within recess 19 after stopper 15 has been inserted to cover the recess 19. As shown in FIG. 6, this buckles stopper 15 to cartridge housing 11 in a tightened manner. The stopper extension portion 25 is extended over the containment space 12 of cartridge housing 11. Therefore, after stopper 15 and cartridge housing 11 are buckled or coupled, the stopper extension portion 25 will capture CD 16 within the containment space 12 between the flanges 26 and the stopper extension portion 25.

Referring to FIGS. 5 and 6, the opening member 17 includes a planar member 27, a multiplicity of bosses 28 aligned with buckle holes 18 and a handle 29 extending from a bottom surface of planar member 27. By the opening member 17, the planar member 27 is brought into contact with cartridge housing 11 on the side of housing 11 having buckling holes 18. At the same time, bosses 28 pass through buckling holes 18 and are inserted into the recess 19 within the cartridge housing 11 to push or displace buckles 24 in the buckle groove 23 on the stopper 15. The buckle 24 is thus released from the stopper flange 21 and the stopper 15 may be removed from cartridge housing 11 and removal of CD 16 may follow.

In the manufacturing process, the buckle device 14 may include a small embossing point member 30 extending from the bottom of buckle 24 in the buckle slot 23. As shown in FIG. 6, the small embossing point member 30 on the bottom of buckle 24 may prevent theft through the use of a long stiff object such as a ball point pen to push the buckle 24. The opening member 17 may be manufactured in other shapes or increasing numbers of holes on cartridge housing 11 corresponding to increased bosses on opening member 17.

The structure of the anti-theft cartridge is not complex. The anti-theft opening device would not affect the demonstration and storage while at the same time its use prevents CDs from being stolen and offers the seller an easier management of the CDs 16.

What I claimed is:

1. An anti-theft cartridge comprising:
   (a) an extended cartridge housing a handle opening formed through one end and a compact disc containment chamber formed within an opposing end thereof;
   (b) a buckling member formed within a central section of said cartridge housing defining a substantially buckling planar member having a plurality of buckle holes passing therethrough, said buckling planar member having formed thereon a plurality of stopper flange members extending internal said cartridge housing, said buckling member forming a recess in said central section of said cartridge housing;

(c) a stopper member for slidable insert over said recess, said stopper member having an extension portion extending over said compact disc containment chamber, said stopper member having a plurality of buckle slots aligned with said buckle holes, each of said buckle slots having a buckle member depending therefrom for releasable coupling to a respective stopper flange member; and, (d) an opening member defining an opening planar member having a plurality of boss members extending from a surface thereof, said boss members being alignable with said buckle holes for insert therethrough of said boss members for contact with and displacement of respective buckle members whereby said buckle members are released from engagement with said stopper flange members.

* * * * *